United States Patent
Hamet et al.

(10) Patent No.: US 11,996,929 B2
(45) Date of Patent: May 28, 2024

(54) PRECODING UNIT, USER TERMINAL, METHODS FOR OPERATING THE SAME AND WIRELESS COMMUNICATION NETWORK

(71) Applicant: Fraunhofer-Gesellschaft zur Förderung der angewandten Forschung e.V., Munich (DE)

(72) Inventors: Bastien Hamet, Erlangen (DE); Christian Rohde, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 519 days.

(21) Appl. No.: 17/181,413

(22) Filed: Feb. 22, 2021

(65) Prior Publication Data
US 2021/0203413 A1 Jul. 1, 2021

Related U.S. Application Data

(63) Continuation of application No. PCT/EP2019/073612, filed on Sep. 4, 2019.

(30) Foreign Application Priority Data

Sep. 6, 2018 (EP) .................................... 18193022

(51) Int. Cl.
*H04B 7/185* (2006.01)
*H04B 7/0456* (2017.01)
(Continued)

(52) U.S. Cl.
CPC ....... *H04B 7/18556* (2013.01); *H04B 7/0456* (2013.01); *H04B 7/0626* (2013.01); *H04B 7/1855* (2013.01)

(58) Field of Classification Search
CPC .......................... H04B 7/18556; H04B 7/0456; H04B 7/0626; H04B 7/1855; H04B 7/0617; H04B 7/18519; Y02D 30/70; H04L 25/0202
(Continued)

(56) References Cited

U.S. PATENT DOCUMENTS

2007/0046537 A1* 3/2007 Tekawy ................. H01Q 1/125
342/357.395
2008/0182585 A1* 7/2008 Palanki ................. H04W 48/12
455/450
(Continued)

OTHER PUBLICATIONS

B. Hamet et al., "Over-the-air field trials of linear precoding for multi-spot-beam satellite systems", 34th AIAA International Communications Satellite Systems Conference (ICSSC), Oct. 2016.
(Continued)

*Primary Examiner* — Inder P Mehra
(74) *Attorney, Agent, or Firm* — NKL LAW; Jae Youn Kim

(57) ABSTRACT

A gateway is configured to communicate with a satellite so as to control the preceding/pre-equalization of a communication between the satellite and at least one terminal based on a channel state of a channel between the terminal and the satellite. The gateway is configured for receiving a location-related information indicating a location of the terminal and for determining a predicted channel state information related to the channel state between the terminal and the satellite using the location-related information. The gateway is configured for controlling the signal processing so as to precode the communication according to the predicted channel state information.

17 Claims, 9 Drawing Sheets

(51) Int. Cl.
*H04B 7/06* (2006.01)
*H04L 25/02* (2006.01)

(58) Field of Classification Search
USPC .......................................................... 370/316
See application file for complete search history.

(56) References Cited

U.S. PATENT DOCUMENTS

| | | | |
|---|---|---|---|
| 2009/0034448 A1* | 2/2009 | Miller | H04B 7/1858 370/316 |
| 2010/0285813 A1 | 11/2010 | Harper | |
| 2014/0003267 A1* | 1/2014 | Yoo | H04W 24/10 370/252 |
| 2014/0126407 A1* | 5/2014 | Zirwas | H04W 24/08 370/252 |
| 2014/0295752 A1 | 10/2014 | Dankberg | |
| 2017/0149493 A1* | 5/2017 | Arapoglou | H04L 25/0224 |
| 2019/0281574 A1* | 9/2019 | Reial | G01S 5/10 |
| 2019/0353748 A1* | 11/2019 | Rydén | G01S 5/14 |

OTHER PUBLICATIONS

Draft ETSI EN 302 307-2 V1.1.1, "Digital Video Broadcasting (DVB); Second generation framing structure, channel coding and modulation systems for Broadcasting, Interactive Services, News Gathering and other Broadband Satellite Applications; Part 2: DVB-S2 Extensions (DVB-S2X)", Oct. 2014.

M. Bergmann et al., "Location-aware channel estimation for capacity gains on multi-beam satellite links", Acta Astronautica, vol. 91, May 19, 2013, pp. 131-136, XP028685847.

W. Guibene et al., "Degrees of Freedom of Downlink Single- and Multi-Cell Multi-User MIMO Systems with Location-Based CSIT", 2013 IEEE 77th Vehicular Technology Conference (VTC Spring), Jun. 2, 2013, pp. 1-5, XP032547970.

A. Pantelis-Daniel et al., "MIMO over Satellite: A Review", IEEE Communications Surveys and Tutorials, Institute of Electrical and Electronics Engineers, US, vol. 13, No. 1, Jan. 1, 2011, pp. 27-51, XP011334509.

* cited by examiner

| Location | Channel Info |
|---|---|
| $x_1/y_1/z_1$ | $Ci_1$ |
| $x_2/y_2/z_2$ | $CI_2$ |
| $x_3/y_3/z_3$ | $CI_3$ |
| $x_4/y_4/z_4$ | $CI_4$ |
| | |
| $x_x/y_x/z_x$ | $CI_x$ |

Fig. 2a

| ID | Location | CSI | Precode-Parameters |
|---|---|---|---|
| 1 | $x_1/y_1/z_1$ | $CSI_1$ | $PP_1$ |
| 2 | $x_2/y_2/z_2$ | $CSI_2$ | $PP_2$ |
| 3 | $x_3/y_3/z_3$ | $CSI_3$ | $PP_3$ |
| 4 | $x_4/y_4/z_4$ | $CSI_4$ | $PP_4$ |
| ... | | | |
| X | $x_x/y_x/z_x$ | $CSI_x$ | $PP_x$ |

Fig. 2b

US 11,996,929 B2

PRECODING UNIT, USER TERMINAL, METHODS FOR OPERATING THE SAME AND WIRELESS COMMUNICATION NETWORK

CROSS-REFERENCES TO RELATED APPLICATIONS

This application is a continuation of copending International Application No. PCT/EP2019/073612, filed Sep. 4, 2019, which is incorporated herein by reference in its entirety, and additionally claims priority from European Application No. 18 193 022.3, filed Sep. 6, 2018, which is incorporated herein by reference in its entirety.

The present invention relates to a gateway configured to communicate with a satellite so as to control the same, to a user equipment and to methods for operating the same. The present invention further relates to a wireless communication network. The present invention further relates to channel information extrapolation.

BACKGROUND OF THE INVENTION

Satellites illuminate earth in beams which are designed (in terms of location, shape, size and the like) by the satellite equipment or by a beam-forming network controllable by the satellite operator. The beams are designed to trade-off with an efficient use of power and coverage area. The beams have not a well-delimited boundary and part of the energy spills over to the neighboring beams. Running such adjacent beams on a same carrier frequency creates interference that can be controlled and used beneficially using MIMO (multiple input multiple output) techniques like precoding as described in [1]. These techniques may use the information about the interfering channel faced by the user.

In order to be able to get the channel information, the users run continuously correlation algorithms on reference sequences being part of the signal framing. Also, all users have then to send back the information to the transmitter side which costs a lot of resources. This information is then used to optimize the data transmission with, for example, precoding technologies.

Known solutions face the problems that the processing cost at the user terminal in order to calculate the channel information is high. Further, the resources used to continuously send the channel information back to the transmitter is high. Further, the trend to implement simple terminals, for example, in the range of the Internet-Of-Things leads to terminals that have a lower quality of their determined channel information. Further, a high amount of data processing may be used at the transmitter/gateway side.

Thus, there is a need for precoding units, terminals and methods for operating the same, overcoming those problems.

It is thus an object of the present invention to provide for precoding units and/or terminals and/or methods for operating the same that allow for a suitable precoding using a low amount of processing at the terminal, a low amount of resources for transmitting relevant information, allowing for simple terminals and a low amount of data processing at the transmitter/gateway side.

SUMMARY

According to an embodiment, a precoding unit configured to precode a communication between the satellite and at least one terminal based on a channel state of a channel between the terminal and the satellite may be configured for: receiving a location related information indicating a location of the terminal; determining a predicted channel state information related to the channel state between the terminal and a satellite using the location related information; and precoding the communication between the satellite and the at least one terminal according to the predicted channel state information.

Another embodiment may have a satellite including an inventive precoding unit.

Another embodiment may have a gateway including an inventive precoding unit.

Another embodiment may have a user terminal configured to communicate with a satellite based on a channel state information, wherein the user terminal is configured for transmitting, to a precoding unit precoding the communication from the satellite to the terminal, a location related information instead of a channel state information.

According to another embodiment, a wireless communication network may have: a satellite; an inventive precoding unit; and at least one inventive terminal.

According to another embodiment, a method for operating a precoding unit configured to precode a communication between a satellite and at least one terminal based on a channel state of a channel between the satellite and the terminal may have the steps of: receiving a location related information indicating a location of the terminal; determining a predicted channel state information related to the channel state between the terminal and a satellite using the location related information; and precoding the communication between the satellite and the at least one terminal according to the predicted channel state information.

According to another embodiment, a method for operating a user terminal configured to communicate with a satellite based on a channel state information may have the steps of: transmitting, to a precoding unit configured for precoding a communication between the satellite and the terminal, a location related information instead of a channel state information.

Another embodiment may have a non-transitory digital storage medium having a computer program stored thereon to perform the method for operating a precoding unit configured to precode a communication between a satellite and at least one terminal based on a channel state of a channel between the satellite and the terminal, the method having the steps of: receiving a location related information indicating a location of the terminal; determining a predicted channel state information related to the channel state between the terminal and a satellite using the location related information; and precoding the communication between the satellite and the at least one terminal according to the predicted channel state information, when said computer program is run by a computer.

Another embodiment may have a non-transitory digital storage medium having a computer program stored thereon to perform the method for operating a user terminal configured to communicate with a satellite based on a channel state information, the method having the steps of: transmitting, to a precoding unit configured for precoding a communication between the satellite and the terminal, a location related information instead of a channel state information, when said computer program is run by a computer.

The inventors have found that satellite communication allows for a same or similar channel between different terminals and the satellite over a wide spreading range of the terminals. In particular, the inventors have found that the channel between a terminal and the satellite is locationdependent. Thus, by informing the precoding unit/transmitter/gateway about the own terminal position or an information related thereto, the precoding unit/transmitter/gateway may determine the relevant channel information or precoding information by use of the location-related information, thereby allowing to prevent the user from determining the channel information, from obtaining a low quality channel information in simple terminals and to cause the high amount of data processing at the precoding unit/transmitter/gateway side. Further, the location-related information may be transmitted back to the precoding unit/transmitter/gateway with a low amount of resources when compared to the channel information.

According to an embodiment, a precoding unit is configured to precode a communication between the satellite and at least one terminal based on a channel state of a channel between the terminal and the satellite. The precoding unit is configured for receiving a location-related information indicating a location of the terminal. The precoding unit is further configured for determining a predicted channel state information related to the channel state between the terminal and a satellite using the location-related information, and for precoding the communication according to the predicted channel state information.

According to an embodiment, the precoding unit is configured for precoding the communication between the satellite and the terminal according to the predicted channel state information and independent from a channel state information determined by the terminal. This allows for preventing occupying the possibly satellite-based channel back to the precoding unit or gateway with a transmission of the channel state information.

According to an embodiment, the precoding unit has access to a memory having stored thereon different predetermined channel state values associated with different locations, wherein the precoding unit is configured for deriving the predicted channel state information using at least one predetermined channel state value. This allows for obtaining the predicted channel state information by a lookup possibly combined with a combination of different stored values, which is both obtainable with a low amount of processing.

According to an embodiment, the precoding unit is configured for interpolating or extrapolating the predicted channel state information using the location-related information and a combination of at least a first predetermined channel state value and a second predetermined channel state value. This may allow for a precise approximation of the channel state information.

According to an embodiment, the location-related information comprises one of a global satellite navigation system location of the terminal, a location ID, an area ID indicating a sub-section of a total area covered by the satellite, a location of a reference terminal, an ID of a reference terminal, an ID of a terminal served by the satellite and/or a distance to a reference terminal. Each of those information and further a combination thereof, allows for an acceptable or even precise approximation of the channel state information determined by the terminal itself and thus for an efficient precoding in the network.

According to an embodiment, the precoding unit is configured for mapping the location-related information to a beam of a plurality of beams formable by the satellite and to control the satellite so as to use the beam for communication with the terminal. I.e., the precoding unit may control the gateway and/or the satellite so as to implement or use precoded communication by use of the approximated or predicted channel state information.

According to an embodiment, the precoding unit is configured for deriving information related to an amplitude and a phase of a beam used by the satellite at the position indicated by the location-related information and to control the gateway and/or the satellite so as to schedule communication to the terminal using the derived beam.

According to an embodiment, the beam is a static or a time variant beam. This allows associating the terminal with a beam formed by the satellite.

According to an embodiment, the precoding unit is configured for iteratively determining the predicted channel state information, wherein the precoding unit is configured for determining the predicted channel state information of a second iteration based on a predicted channel state information of a previous first determination of the predicted channel state information and/or based on a location related information used for the first determination. Alternatively or in addition, the precoding unit is configured for verifying the predicted channel state information using the predicted channel state information of the previous first determination and/or using the location related information used for the first determination. This may allow for avoiding harsh transitions in in determinations or predictions, i.e., the resulting precoding.

According to an embodiment, the precoding unit is located at least partially as part of the satellite and/or at least partially as part of the gateway.

According to an embodiment, a satellite comprising a precoding unit according to an embodiment.

According to an embodiment, a gateway comprises a precoding unit according to an embodiment.

According to an embodiment, a user terminal is configured to communicate with a satellite based on a channel state information, i.e., the communication is precoded, wherein the user terminal is configured for transmitting, to a precoding unit precoding the communication from the satellite to the terminal, a location-related information instead of a channel state information. The location-related information may be transmitted to the precoding unit directly or indirectly, i.e., in a multi-hop mode, wherein such a user terminal allows for a low amount of processing and low requirements of the user terminal and thus for a simple user terminal setup.

According to an embodiment, the user terminal is configured for determining the location-based information based on at least one of a location of the user terminal using a global satellite network module of the user terminal, a location of a reference terminal, decoding of a reference terminal ID of a reference terminal served by the satellite with a signal received by the user terminal, determining a distance between the user terminal and the reference terminal and decoding of a terminal ID of a terminal served by the satellite with a signal received by the terminal. This allows using information that is simply available by the user terminal.

According to an embodiment, the user terminal is configured for determining the location-based information based on the location of the user terminal and to derive at least of a location ID associated with a location and an area-ID indicating a sub-section of a total area covered by the satellite. This allows for transmitting a low amount of information and thus for a low channel load.

According to an embodiment, the user terminal is configured for decoding the terminal ID being the reference terminal ID or the user terminal ID, wherein the user terminal is configured for receiving signals transmitted to one or more terminals, to decode the receive signals, to determine a signal-to-interference-plus-noise-ratio (SINR) for each of the signals and to determine the ID of the terminal being addressed with the signal having a highest signal-to-interference-plus-noise-ratio and to use the terminal ID at least as a part of the location-related information. I.e., the terminal may listen to communication transmitted over the beam that also illuminates the user terminal and may evaluate the information contained therein. One positive aspect of this embodiment is that the SINR is usually determined for other purposes such that there is a re-use of the obtained value.

According to an embodiment, a wireless communication network comprises a satellite, a precoding unit according to an embodiment and at least one terminal according to an embodiment.

According to an embodiment, a method for operating a precoding unit configured to precode a communication between a satellite and at least one terminal based on a channel state of a channel between the satellite and the terminal comprises receiving a location-related information indicating a location of the terminal, determining a predicted channel state information related to the channel state between the terminal and a satellite using the location-related information and precoding the communication between the satellite and the terminal according to the predicted channel state information.

According to an embodiment, a method for operating a user terminal configured to communicate with a satellite based on a channel state information comprises transmitting, to a precoding unit configured for precoding a communication between operating the satellite and the terminal, a location-related information instead of a channel state information.

BRIEF DESCRIPTION OF THE DRAWINGS

Embodiments of the present invention will be detailed subsequently referring to the appended drawings, in which:

FIG. 2a shows a schematic block diagram of a memory to which the gateway may have access, according to an embodiment;

FIG. 2b shows a schematic block diagram of information that may be stored in a memory to which the gateway may have access alternatively or in addition to the memory of FIG. 2a and according to an embodiment;

DETAILED DESCRIPTION OF THE INVENTION

Figure 1:
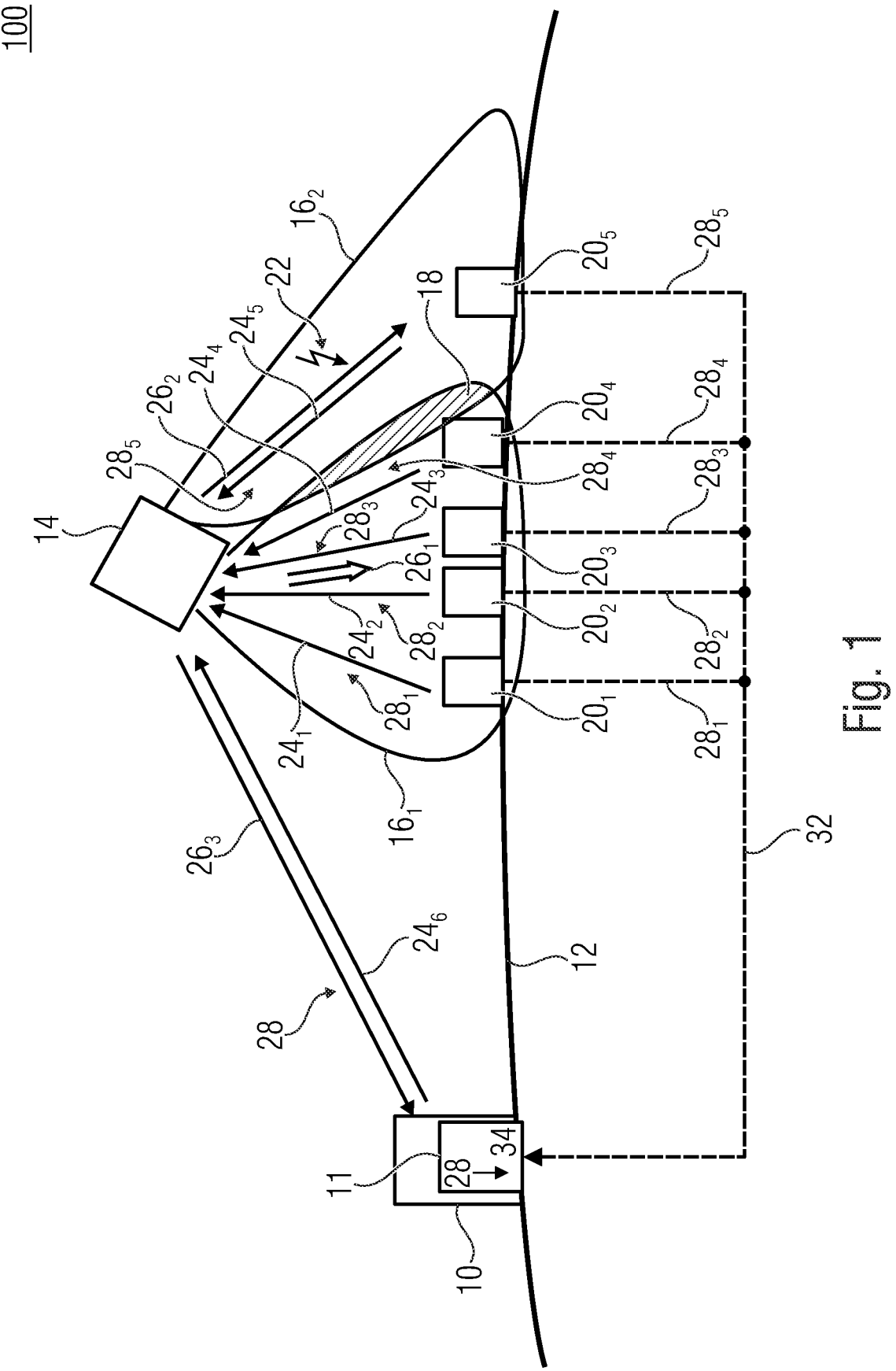
FIG. 1 shows a schematic block diagram of a wireless communication network according to an embodiment, comprising a gateway, a satellite and a plurality of terminals.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference is made to a precoding unit being arranged at a gateway, wherein the precoding unit may form a part of the gateway or may be arranged next to the gateway. Embodiments of the present invention are nevertheless not limited hereto as the precoding unit may be arranged or implemented only partially in or at the gateway or may even be arranged at a different location, i.e., partially or completely anywhere in the network. According to embodiments, the precoding unit may at least partially be implemented at the satellite i.e., may be a part of the satellite.

In the following, reference is made to a gateway for controlling a satellite. Such a control may include instructions for the satellite on how to form and/or use beams formed with the satellite so as to illuminate earth and so as to schedule communication to terminals illuminated by such beams. Amongst other things, the satellite may be configured for implementing a multiple input multiple output (MIMO) communication by use of multiple beams. Such a communication may be bi-directional between the terminal and the satellite, wherein, accordingly, the satellite may bi-directionally communicate with a further terminal or the gateway.

Although the gateway is described so as to be located on earth, a respective controller/gateway so as to control the satellite may alternatively be arranged anywhere else, e.g., airborne, spaceborne, on a ship or below the surface.

Embodiments described herein relate to precoding. Precoding performed in the described embodiments includes, amongst other things like beamforming, beam control and using advantages of interference, a pre-equalization of the interfering channel already at the transmitter/gateway side.

FIG. 1 shows a schematic block diagram of a wireless communication network 100 according to an embodiment, comprising a gateway 10 and a plurality of terminals $20_1$, $20_2$, $20_3$, $20_4$ and $20_5$. A precoding unit 11 of the network 100 may be an individual entity but may also at least partially be a part of the gateway 10. The gateway 10 and/or one or more of the terminals $20_1$ to $20_5$ may be on, above or below a surface 12. Although the embodiments described herein refer to the gateway 10 and the terminals $20_1$ to $20_5$ being terrestrial, the explanations given also refer to other types, for example, airborne nodes. The wireless communication network 100 comprises a satellite 14 being controlled by the gateway 10. The satellite 14 may be arranged, for example, in a geo-stationary orbit, a lower-earth orbit, a medium-earth orbit or a different orbit. Alternatively or in addition, the precoding unit may at least partially be implemented as part of the satellite 14. Alternatively or in addition one or more functionalities may also be arranged distant to the satellite 14 and/or the gateway 10. I.e., the precoding unit 11 may be localized or distributed entity.

The precoding unit 11 may be configured for controlling and/or adapting precoding performed for signals transmitted by the satellite 14, e.g., towards the terminals $20_1$ to $20_5$. Such a precoding may be determined on the ground, i.e., the satellite 14 may be blind/transparent for such precoding allowing for using legacy satellites being implemented without precoding capabilities acting as relays. Alternatively or in addition, the satellite 14 may be configured for implementing the precoding i.e., the respective signal processing, e.g., the satellite 14 may comprise a processor being adapted correspondingly.

For example, as a distributed entity being partially implemented at the gateway 10 and partially at the satellite 14, precoding may be a transmit signal processing, which comprises a pre-equalization or precoding of a cross-talk channel. As such a processing may be at the gateway 10 and/or at the satellite 14, e.g., if it has a powerful onboard processor, at the gateway functions like a channel state information collection, a user scheduling, a calculation of the precoding matrices and/or a sending of such matrices to the satellite may be a functionality implemented at the gateway 10. At the satellite, the precoding matrices may be applied to the transmission signals. Alternatively or in addition, the matrices may also be determined at the satellite, e.g., when providing the satellite 14 with the channel state information or with information that allows for predicting such a channel state information, amongst which there is a location related information.

By way of example, the precoding unit 11 is described as being a part of the gateway 10. The precoding unit 11 may be configured to control a signal processing of a communication between the satellite 14 and the terminals $20_1$ to $20_5$. The gateway 10 may control the satellite 14 so as to form one or more beams $16_1$ and/or $16_2$ that may use a same or different carrier frequency and a same or different modulation scheme. In an overlap region 18 of adjacent beams $16_1$ and $16_2$ interference may occur. To reduce or prevent negative effects of the interference, precoding in terms of a pre-equalization of the interfering channel as described in [1] may be used. The gateway 10, the precoding unit 11 respectively, may provide for precoded signals for to the satellite. Alternatively, the precoding unit 11 may provide data that allows the satellite to precode signals transmitted towards the terminals $20_1$ to $20_5$.

Whilst in uplink communication $24_1$ to $24_5$ other effects may occur, such interference, e.g., influencing communication of the terminal $20_4$ and/or a disturbance 22 may affect or interfere a downlink communication $26_1$ and/or $26_2$ between the satellite 14 and the terminals $20_1$ to $20_5$ using the respective beams $16_1$, $16_2$ respectively. The interference 22 among the downlink beams may be influenced by, for example, an object, a different obstacle, a weather-based interference such as clouds, rain, dust, buildings or the like. However, such impairments cannot be easily compensated by the location based precoding, because the locally estimated CSI (including the effect of these impairments) may be used for correct precoding. Once the terminal observes this situation that the precoded signal does not match the interference scenario, the terminal can activate its CSI estimation and feed back the CSI to the gateway in order to improve the situation with up-to-date CSI.

To allow the precoding unit 11 to precode the communication between the satellite 14 and one or more of the terminals $20_1$ to $20_5$, e.g., the beam forming implemented for forming the beams $16_1$ and/or $16_2$ for implementing the downlink communication $26_1$, $26_2$ respectively, the precoding unit 11 may use information indicating a condition or a state or a status of the respective channel. Such information may be referred to as a channel state information. Based thereon, specific actions of the precoding may be derived, for example, on how to form one or more of the beams $16_1$ and/or $16_2$ with respect to an amplitude, a phase or different parameters, i.e., (complex valued) channel coefficient(s) that may be part of the whole channel state information. Either the respective action or information allowing for deriving the actions, e.g., the channel state information, may be transmitted to the satellite 14 using an uplink $24_6$ between the gateway 10 and the satellite 14.

The precoding unit 11 may be configured for receiving a location-related information 28, the location-related information indicating a location of a respective terminal $20_1$ to $20_5$. The location-related information 28 may be received, for example, from the satellite 14 via a downlink $26_3$ to the gateway 10. For example, the terminals $20_1$ to $20_5$ may transmit a respective location-related information $28_1$, $28_2$, $28_3$, $28_4$, $28_5$ respectively through a respective uplink 24 to the satellite 14, the satellite 14 forwarding the information to the gateway 10. Alternatively or in addition, the satellite 14 may also transmit the location related information 28 to a different location if the precoding unit is at least partially located elsewhere. Alternatively or in addition, other channels or networks such as a terrestrial network 32 being wired or wireless may be used to transfer the location-related information 28 to the precoding unit 11.

The precoding unit 11 is configured for determining a predicted channel state information 32 using the location-related information 28. For example, each location-related information $28_1$ to $28_5$ may be transferred or converted to a respective predicted channel state information 32. I.e., instead of the terminals $20_1$ to $20_5$ determining the respective channel state information and transmitting such information back to the precoding unit 11, the precoding unit 11 may derive or predict or approximate the channel state information based on the location-related information 28.

A use of the satellite 14 may allow that terminals illuminated by a common beam having a wide coverage range nevertheless face a same or at least similar channel. Further, the channel state may be influenced essentially by a topography of the earth surface 12 or static disturbances 22 such as buildings. The channel information is therefore location-specific. This can be considered by the precoding unit 11 while converting the location-related information to the predicted channel state information 34. This exploits that the precoded signals exhibit interference mitigation possibly only at the target terminal locations.

The gateway 10 may provide precoded signals to the satellite 14 or may provide information to the satellite 14 so as to enable the satellite 14 for performing precoding. Both ways allow for precoding the communication between the satellite 14 and the terminals $20_1$ to $20_5$ according to the predicted channel state information 34. Although the use of the predicted channel state information 34 may be used in combination with a channel state information determined by the terminals $20_1$ to $20_5$, embodiments are implemented such that the precoding unit 11 is configured for precoding the communication between the satellite 14 and the terminals $20_1$ to $20_5$ according to the predicted channel state information 34 while being independent from a channel state information determined by the respective terminal $20_1$ to $20_5$. This is useful if the feedback link is broken or the provided channel state information is of bad quality. Alternatively or in addition resources may be saved.

Although the wireless communication network 100 is described as comprising five terminals $20_1$ to $20_5$, any other number of terminals may be arranged such as 0, 1 or more, 2 or more, 5 or more, 10 or more, 100 or more or 1000 or more. Although the satellite 14 is described as forming two beams $16_1$ and $16_2$, any other number of beams may be formed by the satellite 14, for example, at least 1, at least 2, at least 5, at least 10, at least 100 or even a higher number. The beams may be formed independently from each other, for example, using a beam-forming network. The beams may be time variant with respect to the beam direction or beam coverage shape or an amplitude and/or a phase with respect to a specific location, but may also be static and may be switched on and off.

For example, the satellite 14 may be adapted so as to form different beams for different regions of a surface 12. The precoding unit 11 may be configured for mapping the location-related information, i.e., the location indicated thereby, to a beam of the plurality of beams formable by the satellite. The gateway 10 or the precoding unit 11 may further control the satellite 14 so as to use the beam to which the location is mapped for communication with the respective terminal. The gateway 10 may alternatively or in addition be configured for deriving information related to an amplitude and/or a phase of a beam used by the satellite at the position indicated by the location-related information 34. The gateway 10 may control the satellite 14 so as to schedule communication to the terminal using the derived beam.

The network 100 is described as comprising the gateway 10, the satellite 14 and the precoding unit 11. It is noted that the respective functionality relating to a control of the satellite 14 and in particular the control of the precoding may be performed at locations or entities being different as the ones described.

FIG. 2a shows a schematic block diagram of a memory 36 to which the precoding unit 11 may have access. For example, the memory 36 may be directly connected to the precoding unit 11 or may be accessible over a wired or wireless network. The memory 36 may have stored thereon a number of x different locations $38_1$ to $38_x$. The memory 36 may further have stored thereon predetermined channel state values or channel information (CI) or sets thereof $42_1$ to $42_x$, wherein to each location $38_1$ to $38_x$ a predetermined channel state value set $42_1$ to $42_x$ may be associated. Each channel state value set $42_1$ may include channel state values of one, more or all beams which can be received at the current location $38_k$. For example, the locations $38_1$ to $38_x$ and the predetermined channel state values sets $42_1$ to $42_x$ may be combined with each other in a database, a lookup table or the like. The precoding unit 11 may be configured for deriving the predicted channel state information 34 using at least one of the predetermined channel state value sets $42_1$ to $42_x$ from the memory 36. For example, the location-related information may indicate a position being equal to a location $38_1$ to $38_x$. The precoding unit 11 may obtain the associated predetermined channel state value. The predetermined channel state value associated to the location may either directly be the channel state information used for precoding or may be any other parameter or set of parameters that allow deriving of the channel state information 34. For example, the predetermined channel state value sets 42 may comprise complex channel coefficients and/or information related to an amplitude and a phase of one or more, e.g., all involved beams received at location $38_k$. However, the locations may span a grid that may be dense but is not required to be dense. Especially when using a rather rough density, embodiments provide for a precoding unit that is configured for interpolating and/or extrapolating the stored or received locations.

When referring again to FIG. 2a, the memory content may have additional information that may be illustrated as a table may have at least one further column providing information which interpolation/extrapolation technique (and/or parameters of it) shall be applied. Such information may be beam individual or beam global. E.g., 2D or 3D linear or splines or cubic polynomial may be indicated or contained.

Alternatively, the location-related information 28 may indicate a location being different from the stored locations $38_1$ to $38_x$. The gateway 10 may be configured for quantizing the indicated location to a stored location and may then use the predetermined channel state value sets $42_1$ to $42_x$. Alternatively or in addition, the gateway 10 may be configured for extrapolating or interpolating a new predetermined channel state value, for example, by forming a mean value based on a criterion suitable for combining two or more locations $38_1$ to $38_x$, predetermined channel state value sets $42_1$ to $42_x$ respectively. By way of example, when the indicated location is arranged on a line between two of the pre-stored locations $38_1$ to $38_x$, the gateway 10 may be configured for determining the predicted channel state information based on a weighted combination of the two associated predetermined channel state value sets 42, wherein the weight may be, for example, based on the distance to the respective location 38. Alternatively or in addition, further locations may be considered for combining different predetermined channel state values, for example, in order to obtain a triangulation or the like.

FIG. 2b shows a schematic block diagram of information that may be stored in a memory 36' to which the gateway 10 may have access alternatively or in addition to the memory 36. In the memory 36', the locations 38 may be stored, wherein to each location 38 an ID 44, a channel state information or set thereof 46, e.g., the predetermined channel state value set 42, and/or precode-parameters 48 indicating a precoding of a respective beam may be associated. The precode-parameters 48 may alternatively or in addition to the channel state information 46 be contained in the predetermined channel state values 42.

The identifier 44 may be associated with an ID of a reference terminal, a location itself, a distance to a reference location or a distance to a terminal or reference terminal. Alternatively, each of such information may be a further field or information stored in the memory 36 or 36'.

For example, the location-related information may comprise one or more of the following information: a location of the respective terminal within a global satellite navigating system such as the Global Positioning System (GPS), Galileo or Glonass, a location ID, an area ID indicating a subset of a total area covered by the satellite, a location of a reference terminal, an ID of a reference terminal, an ID of a terminal served by the satellite and/or a distance to a reference terminal. Different terminals may transmit different location-related information and/or different combinations of location-related information. Alternatively, each terminal may transmit a same type of information. Furthermore, a terminal may switch the type of the information depending on signal reception conditions or changed availability of the information. Each information may be suitable as long as it allows associating a predicted channel state information with the location indicated by the location-related information.

Although the location 38 is indicated as comprising a three-dimensional coordinate within an x/y/z-coordinate system, it may be sufficient to use a 2D-coordinate. Alternatively or in addition, a different coordinate system may be used.

A user terminal such as one or more of the user terminals $20_1$ to $20_5$ may be configured to communicate with the satellite 14 based on a channel state information, i.e., the satellite 14 may perform precoding. The respective user terminal may be configured for transmitting, to the precoding unit 11, e.g., the gateway 10, the location-related information 28 instead of a channel state information. The location-related information 28 may be delivered to the precoding unit 11 via the satellite 14 or via an alternative network. The terminal may comprise, for example, a global satellite network module such as a GPS module, a Galileo-module or a Glonass-module and may be configured for determining its own position using the module. The terminal may report its determined location and/or may, for example, have access to a lookup table or a database that indicates at least one of a location ID associated with the actual location, an area ID indicating a sub-section of a total area covered by the satellite or the like.

Alternatively or in addition, the terminal may listen to communication it receives although it is not the recipient of the message. When referring again to FIG. 1, for example, each of the terminals $20_1$, $20_2$ and $20_4$ may listen to a signal transmitted through the downlink $26_1$ using the beam $16_1$ and being directed to the terminal $20_3$. Some part of the respective signal may be decodable by the other terminals allowing them to decide if the communication is directed to them or not. Alternatively or in addition, some part of the signal may be used for synchronization and may thus also be decodable by nodes not being the recipient. The wireless communication network 100 may comprise one or more reference terminals to which the channel is known and/or which are stationary. The reference terminals may also be scheduled with communication such that a different terminal may receive and decode part of the communication directed to the reference terminal and may identify that it receives communication directed to the reference terminal. The terminal may then report to the precoding unit the identifier associated with the reference terminal so as to indicate that it is near the reference terminal and may thus, at least in a coarse manner, indicate its own position. According to an embodiment, the terminal may decode all of the information it receives and may thus decode, at least partially, messages directed towards different terminals. The terminal may evaluate a quality of reception of the signals being precoded for other nodes, e.g., by determining a signal-to-interference-plus-noise-ratio (SINR) which may be easily determined. The terminal may then select the identifier to which one of the highest or even the highest SINR is associated and may report back the ID thereof or the location thereof. I.e., the terminal may not be required to report back a concrete position as it may be sufficient to inform the precoding unit 11 about a location to be used. This location to be used, i.e., the location indicated with the location-related information, may differ from the real location of the terminal but is advantageously located within a beam of the satellite 14 that in fact illuminates the terminal.

Figure 3A:
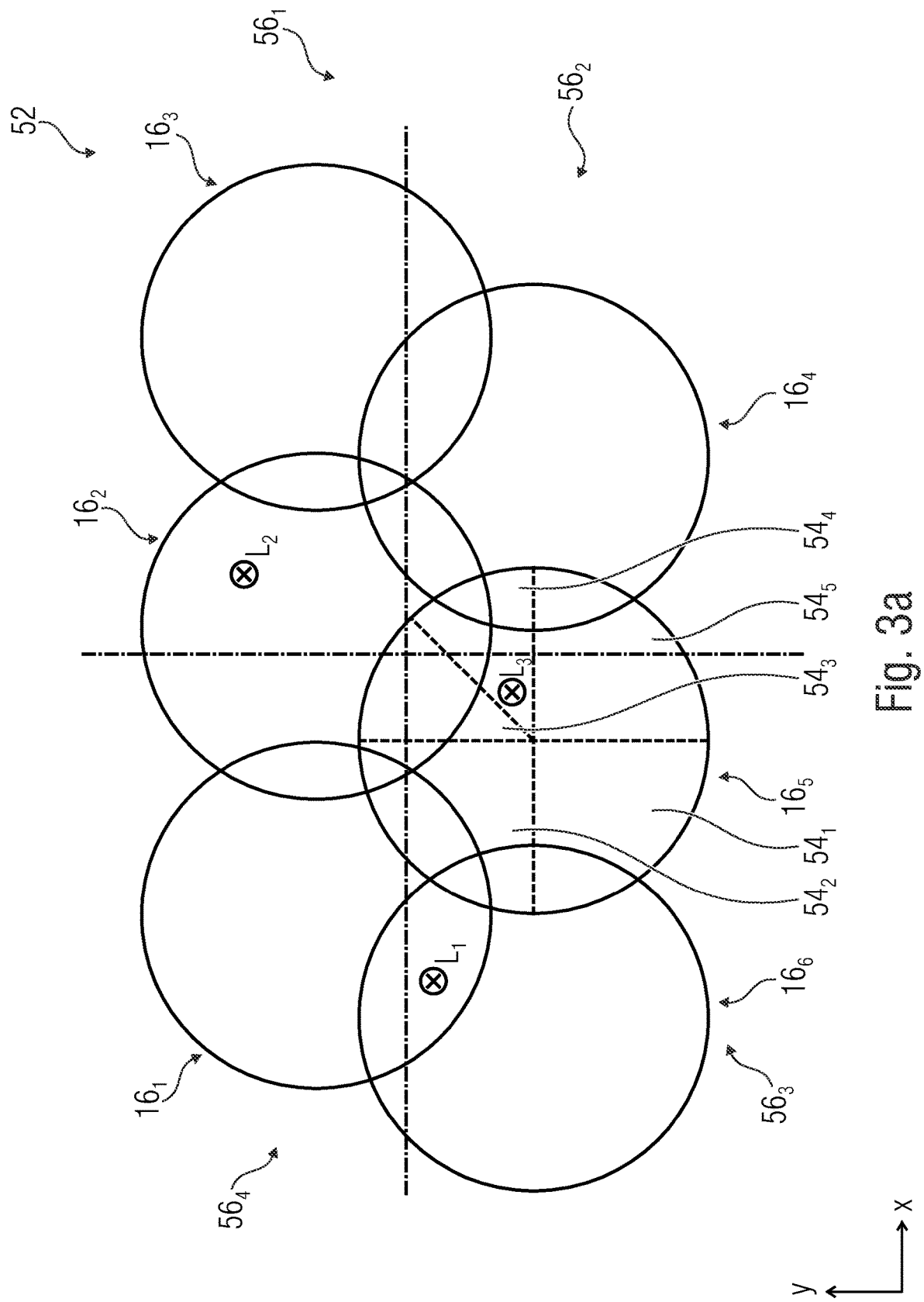
FIG. 3a shows a schematic top view on a schematic coverage range being covered by the satellite according to an embodiment.

FIG. 3a shows a schematic top view on a schematic coverage range 52, being, for example, a part of earth's surface 12 in FIG. 1. The coverage range 52 may at least partially be illuminated by a plurality of beams $16_1$ to $16_6$ formable with the satellite simultaneously and/or subsequently. A terminal that prepares to transmit its location-related information 28 may be configured for indicating one or more beams illuminating the own location. For example, the terminal may be arranged at location $L_1$ being illuminated by beams $16_1$ and $16_6$. The location-related information 28 may comprise information indicating the beam $16_1$ and/or $16_6$.

In contrast, location $L_2$ may be illuminated only by beam $16_2$ such that the location-related information 28 comprises a respective information. Alternatively or in addition, the location-related information 28 may comprise an area-ID, wherein the area-ID may indicate an area $54_1$ to $54_5$ being a part or a region of an area covered by a respective beam such as the beam $16_5$. For example, location $L_3$ may be indicated by indicating the beam $16_5$ and/or the area $54_4$ in the location-related information. Alternatively or in addition, other arbitrary areas $56_1$ to $56_4$ of the coverage range 52 may be indicated by a respective area-ID.

Figure 3B:
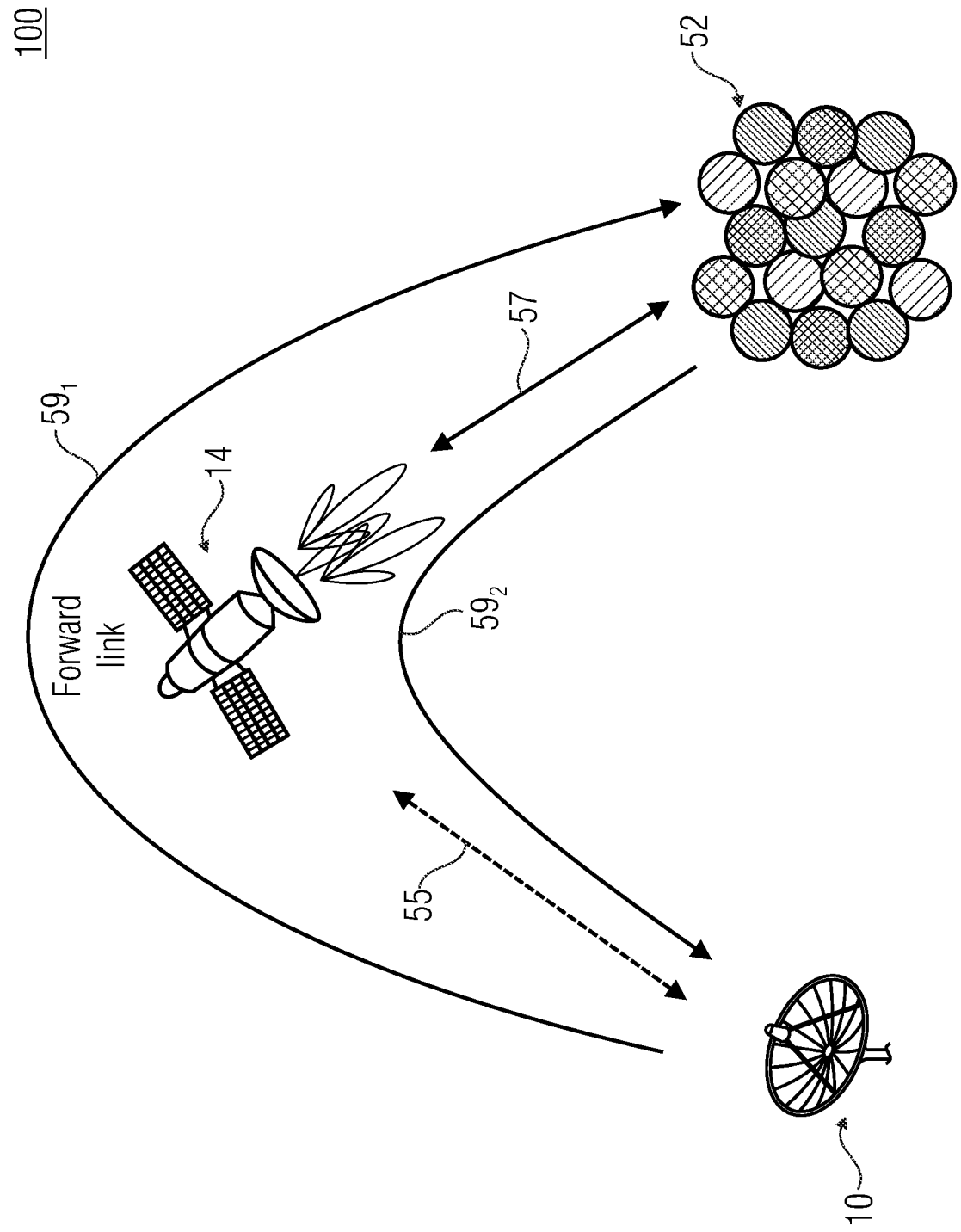
FIG. 3b shows a schematic block diagram of the wireless communication network of FIG. 1 for illustrating a common control of the satellite by the gateway over a feeder link.

FIG. 3b shows a schematic block diagram of the wireless communication network 100 for illustrating a common control of the satellite 14 by the gateway 10 over a feeder link 55, e.g., comprising uplink $24_6$ and/or downlink $26_3$. Via the feeder link 55 information such as precoded signals and/or information allowing the satellite 14 to perform precoding may be transmitted. User links 57 may comprise uplinks $24_1$ to $24_5$ and/or downlinks $26_1$ to $26_5$, wherein, commonly, a forward link $59_1$ from the gateway 10 to the terminals and a return link 592 from the terminals to the gateway 10, each via the satellite 14 may be implemented.

Figure 3C:
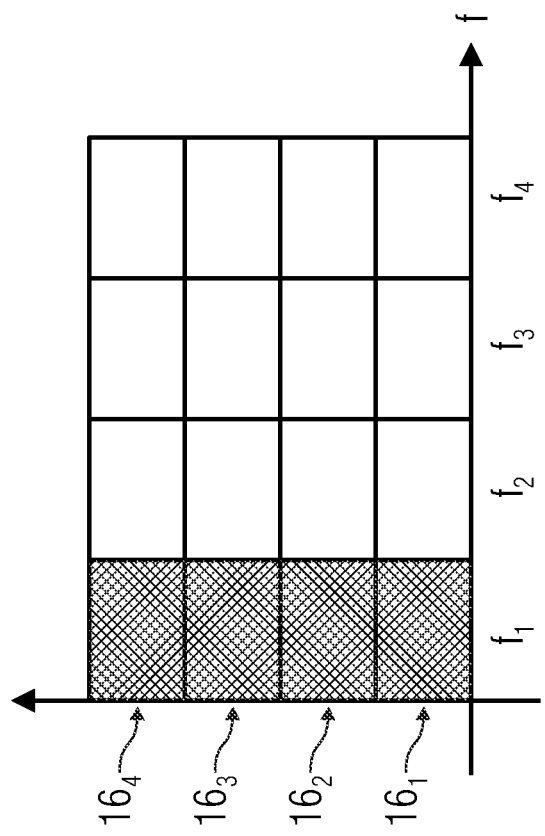
FIG. 3c shows a schematic diagram of an example beam allocation of e.g., 4 beams, wherein each beam is controlled to occupy a different center frequency.

FIG. 3c shows a schematic diagram of an example beam allocation of e.g., 4 beams $16_1$ to $16_4$, wherein each beam $16_1$ to $16_4$ is controlled to occupy a different center frequency or frequency range $f_1$ to $f_4$. I.e., different beams may comprise low interference. Each beam may use a different frequency for transmission and thus interference can be neglected. A shading of the frequency ranges may correspond to a shading of the regions of the coverage range 52 in FIG. 3b.

Figure 3D:
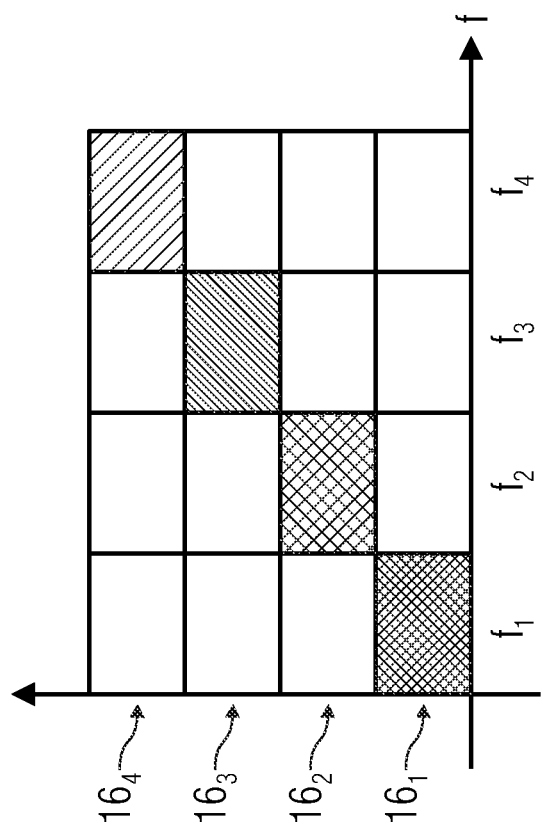
FIG. 3d shows a schematic diagram of an example beam allocation of e.g., 4 beams, wherein each beam is controlled to occupy a same center frequency.

FIG. 3d shows a schematic diagram of an example beam allocation of e.g., 4 beams $16_1$ to $16_4$, wherein each beam $16_1$ to $16_4$ is controlled to occupy a same center frequency or frequency range $f_1$. This may lead to interference being addressed by precoding. In contrast to FIG. 3c, precoding enables transmission with frequency reuse factor 1. Thus, the same frequency resource may be used by all beams, wherein the frequency ranges may thus be broader when compared to FIG. 3c.

Figure 4:
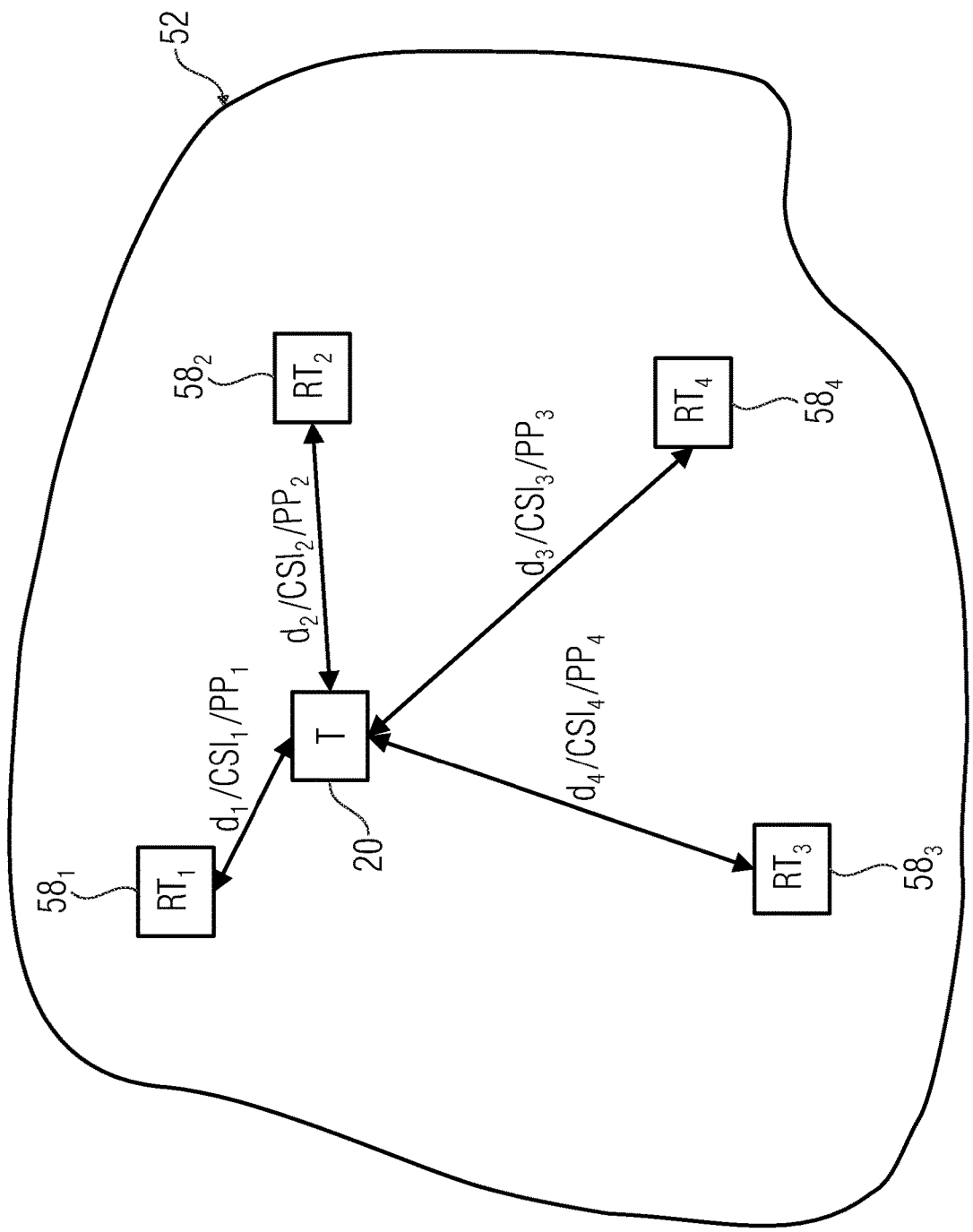
FIG. 4 shows a schematic diagram of a part of the coverage range of FIG. 3 in which terminals are located in accordance with an embodiment.

FIG. 4 shows a schematic diagram of a part of the coverage range 52 being illuminated by one or more beams. The terminal 20 determines a presence of a number of reference terminals $58_1$ to $58_4$ to which it is located with a distance d and/or that are precoded based on a respective channel state information and/or by use of respective precode parameters (PP). The terminal 20 may evaluate signals directed towards the reference terminals $58_1$ to $58_4$ and may include deduced information into this location-related information 28 that, for example, indicates reference terminal $58_1$ based on a closest distance or the same or a different reference terminal $58_1$ to $58_4$ based on a good reception of the respective signal, e.g., indicated by a high signal quality measure such as SNIR. Other values such as SNR or the like are possible without limitation. I.e., the terminal may use any information that allows identifying the reference terminal at the precoding unit, e.g., identifiers, locations, channel information, frequencies or set of symbols used or the like. The location-related information may alternatively or in addition comprise information such as a channel state information (CSI) of a reference terminal 58 and/or the precoding parameters used for the reference terminal 58.

In other words, an aspect of the invention is to use the user's location such as GPS or in the beam-forming pattern in order to predict the channel information of the terminal. As in precoding technologies only the relative channel information between the beams may be used, it is possible to extract the channel information from the user's location. Either the GPS location is mapped to the beam-forming pattern or the location in the beam-forming pattern can be used. Reference terminals can also be used to derive the channel information and the other users advantageously the precoding unit can then extrapolate the respective channel information from their distance compared to the reference terminal. The reference terminal may be a terminal having the best signal quality as possible to obtain the most accurate information and to avoid propagating errors. Designing a beam-forming pattern comprises allocating the energy from the satellite into a local area on earth. The beam-forming provides the precoding unit or gateway 10 with the amplitude and phase difference between the signals from each beam at any location. This information may correspond to the relative channel information which may be sufficient to use these new technologies like precoding or other MIMO techniques. Satellites may exhibit a static beam-forming where beams are only activated or deactivated as well as satellites may support dynamic beam forming as well so as to direct the beams towards a location and in a size according to the current needs. However, in both cases, the network control at the precoding unit or gateway may have knowledge of it, wherein dynamic beams may lead to larger databases or re-calculation of the databases. This may be exploited by the embodiments described herein along with the satellite-specific side information that amplitude and phase vary only marginally over large distances, i.e., km-distances, on earth.

Instead of continuously calculating, at each terminal, the channel information and to send it back to the transmitter/gateway/precoding unit, the GPS location or other location-related information that may be mapped to the beam-forming pattern, can be used to obtain the channel information for any user. If the beam-forming data cannot be used for determining the coefficients, the channel coefficients can also be measured from one or more reference terminals, e.g., multiple of them may be spread in each coverage area. This channel information may be fed back to the precoding unit along with the reference terminal GPS location. At the precoding unit, all this data may be collected and used for extrapolation/interpolation to other GPS locations, where the user terminals are located. This allows for a fusioning of the beam-forming database and the feedback of the terminals.

In case no location information is available or foreseen to be available at the user terminal side, the user terminal may determine the nearest reference terminal observation of the downlink data. Commonly, each beam may be dedicated to a known reference sequence having a sequence ID and being chosen from a set of mutually orthogonal reference sequences, which is transmitted in a regular way for terminals synchronization, so that the terminal may determine the sequence ID during synchronization. Then, the user terminal may observe the precoded data, which may comprise further reference data fields, header fields for signaling and/or payload data fields carrying the user content. Precoding may change from frame to frame of the implemented communication standard. Each frame may comprise the mentioned fields allowing addressing different target user terminals and/or reference terminals. So, the user terminal may use the reference data fields and header fields to estimate SNIR values. The determined frame with maximum SNIR value means that the applied precoding fits best to the current user terminal location. In this case, the user terminal may decode the header field and may deduce the target user terminal ID or reference terminal ID or area ID, which finally means a location ID or a location-related information. This location-related information (location ID) may be fed back via the return link to the gateway instead of the channel estimates. To improve this scheme, the gateway may send from time to time also precoded (dummy) frames to user terminals or reference terminals, which do not currently demand any data from the network. However, the listening terminal has improved chance to find the nearest terminal in shorter time.

These techniques allow that each terminal does not have to continuously calculate and send back its channel information which enables the use of legacy terminals, i.e., more simple terminals, that are possibly unable to reliable calculate their channel information. It also makes the use of new technologies such as MIMOs possible while using legacy terminals which are possible not foreseen to be able to do this processing. Embodiments also free resources on the return link since the channel information may directly be calculated at the transmitter side, i.e., the gateway or precoding unit. Therefore, the amount of data to be stored and processed on the transmitter/precoding unit/gateway side may be low. I.e., having the channel information derived at the transmitter/precoding unit/gateway side from the user's location or a relative position in the beam-forming pattern, the users are not required to calculate such information itself. It brings, amongst other things, for solutions to the above-described problems:

Older generation terminals can be re-used in the new generation systems requiring channel information;

Simple terminals with lower signal quality can still make use of good channel information;

The channel information does not have to be sent back from the users to the transmitter/precoding unit/gateway which saves a lot of resources; and The amount of data to be processed at the transmitter/precoding unit/gateway is largely reduced.

Such simple/cheaper or older generation of receivers in satellites multi-beam systems may thus profit from the use of technologies requiring information about the user's channel information such as precoding or MIMO technologies. These new technologies will be used in the next generation satellite systems as shown by the development of the standard in this direction [2]. These new generation technologies may have one point in common, being that they involve processing on the receiver's side which means to develop a new generation of receivers. Embodiments allow to also re-use the terminals from the current generation or cheaper new generation terminals.

Figure 5:
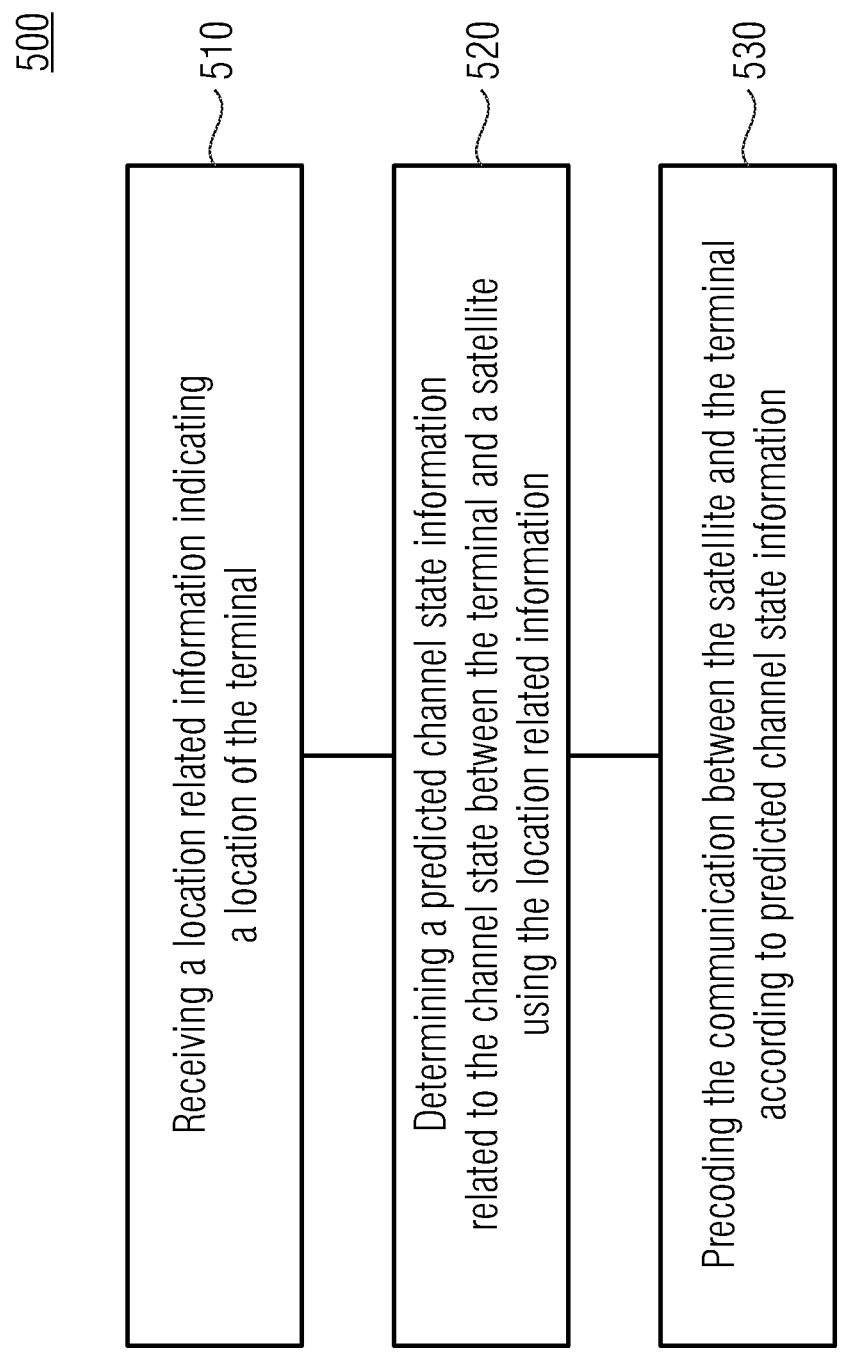
FIG. 5 shows a schematic flowchart of a method according to an embodiment, for operating a gateway.

FIG. 5 shows a schematic flowchart of a method 500 for operating a precoding unit, e.g., located at a gateway such as the gateway 10 and/or at a satellite such as the satellite 14. The method 500 comprises a step 510 in which a location-related information indicating a location of the terminal is received at the precoding unit. A step 520 comprises determining a predicted channel state information related to the channel state between the terminal and a satellite using the location-related information. A step 530 comprises controlling the gateway and/or the satellite so as to precode the communication with the terminal according to the predicted channel state information in order to reduce/mitigate the mutual interference among the involved terminals.

At least one earlier predicted channel state value or information of a terminal may be taken into account for calculation and/or verification of the current/actual channel state prediction. For example, for determining the predicted channel state information, the precoding unit may use the location related information. According to an embodiment, the precoding unit may exclusively use the location related information. According to a different embodiment, the precoding unit may combine the location related information with further kind of information such as a type of the terminal to be served or the like.

According to an embodiment, the predicted channel state information to be used for the subsequent precoding may be determined or predicted memoryless, i.e., from the scratch, based on the present location related information. According to an embodiment, determining of the predicted channel state information may also incorporate preceding predictions, i.e., may be performed with memory. According to an embodiment, the precoding unit may be configured for averaging an arbitrary number of preceding predictions, e.g., at least two, at least 4, at least 8 or even more such as at least 10 or 20. According to an embodiment, the arbitrary number may be incorporated using a weighted averaging, e.g., the more time has lapsed between the prediction of the considered value, the less weight it gets, e.g., based on the determination rule:

$$CSI_P(t) = a \cdot CSI_P + (1-a) \cdot CSI_P(t-1)$$

with $CSI_P(t)$ being the predicted channel state information to be used for precoding in iteration t, $CSI_P$ being the channel state information derived from the current/present location related information, $CSI_P(t-1)$ being the predicted channel state information of a/the previous iteration and a being a weighting factor larger than 0 and less than 1.

Alternatively or in addition, the precoding unit may be configured for combining location related information of one or more previous iterations with the present location related information so as to obtain a combined, smoothed or filtered location related information and to determine the predicted location related information based on the combined, smoothed or filtered location related information. I.e., alternatively or in addition to considering preceding predicted CSI, preceding location related information may be used.

The given examples are only a few of a plurality of possibilities to obtain a precoding unit that is configured for determining the predicted channel state information based on a present predicted channel state information and/or location related information and based on predicted channel state information and/or location related information of a previous determining of the predicted channel state information. The precoding unit may iteratively determine the predicted channel state information whilst in a present or current iteration information and/or results of one or more previous iterations are incorporated.

Alternatively or in addition, for providing verification, a change in the location information and/or in the CSI may be monitored. For example, the change exceeding a predetermined threshold may be recognized and may be interpreted like special operations being involved such as determining or predicting new CSI, performing a special kind of precise measurements and/ore using additional information for predicting the channel state information.

Figure 6:
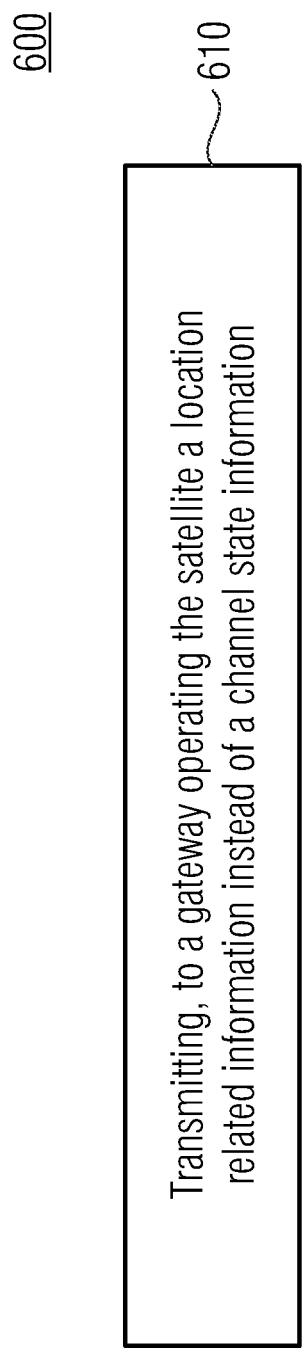
FIG. 6 shows a schematic flowchart of a method according to an embodiment, for operating a terminal.

FIG. 6 shows a schematic flowchart of a method 600 for operating a terminal such as the terminal 20. The method 600 comprises a step 610 in which a location-related information is transmitted to a gateway instead of a channel state information for allowing precoding.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] B. Hamet, C. Rohde, P. Bhave, A. Liddell, "Over-the-air field trials of linear precoding for multi-spot-beam satellite systems", 34th AIAA International Communications Satellite Systems Conference (ICSSC), October 2016

[2] Draft ETSI EN 302 307-2 V1.1.1 (2014 October), Digital Video Broadcasting (DVB); Second generation framing structure, channel coding and modulation systems ( . . . ); Part 2: DVB-S2 Extension (DVB-S2X).

The invention claimed is:

1. A precoding unit configured to precode a communication between a satellite and at least one terminal based on a channel state of a channel between the terminal and the satellite, wherein the precoding unit is configured for:
   receiving a location related information indicating a location of the terminal;
   determining a predicted channel state information related to the channel state between the terminal and the satellite using the location related information; and
   precoding the communication between the satellite and the at least one terminal according to the predicted channel state information, wherein the precoding unit is adapted to at least one of:
   that the precoding unit is configured for accessing a memory having stored thereon different predetermined channel state values associated with different locations, wherein the precoding unit is configured for deriving the predicted channel state information using at least one predetermined channel state value;
   that the precoding unit is configured for interpolating or extrapolating the predicted channel state information using the location related information and a combination of at least a first predetermined channel state value and a second predetermined channel state value;
   that the precoding unit is configured for iteratively determining the predicted channel state information, wherein the precoding unit is configured for determining the predicted channel state information of a second iteration based on a predicted channel state information of a previous first determination of the predicted channel state information and/or based on a location related information used for the previous first determination of the predicted channel state information; and
   that the precoding unit is configured for verifying the predicted channel state information using the predicted channel state information of the previous first determination of the predicted channel state information and/or using the location related information used for the previous first determination of the predicted channel state information.

2. The precoding unit of claim 1, wherein the precoding unit is configured for precoding the communication between the satellite and the terminal according to the predicted channel state information and independent from a channel state information determined by the terminal.

3. The precoding unit of claim 1, wherein the location related information comprises at least one of:
   an area ID indicating a subsection of a total area covered by the satellite;
   a location of a reference terminal;
   an ID of a reference terminal;
   an ID of a terminal served by the satellite; and
   a distance to a reference terminal.

4. The precoding unit of claim 1, wherein the precoding unit is configured for mapping the location related information to a beam of a plurality of beams formable by the satellite and to control the satellite so as to use the beam for communication with the terminal.

5. The precoding unit of claim 1, wherein the precoding unit is configured for deriving information related to an amplitude and a phase of a beam used by the satellite at the position indicated by the location related information and to control the satellite so as to schedule communication to the terminal using the derived beam.

6. The precoding unit of claim 5, wherein the beam is a static or a time variant beam.

7. The precoding unit of claim 1, wherein the precoding unit is located at least partially as part of the satellite and/or at least partially as part of the gateway.

8. A satellite comprising a precoding unit according to claim 1.

9. A gateway comprising a precoding unit according to claim 1.

10. A user terminal configured to communicate with a satellite based on a channel state information, wherein the user terminal is configured for transmitting, to a precoding unit precoding communication from the satellite to the terminal, a location related information instead of a channel state information,
    wherein the user terminal is configured for determining the location related information based on decoding of a terminal ID of the terminal served by the satellite, the terminal ID being a reference terminal ID or a user terminal ID; and
    wherein the user terminal is configured for receiving signals transmitted to one or more terminals, to decode the received signals, to determine a signal-to-interference-plus-noise-ratio for each of the signals, to determine the terminal ID being addressed with a signal comprising a highest signal-to-interference-plus-noise-ratio, and to use the terminal ID at least as a part of the location related information.

11. The user terminal of claim 10, wherein the user terminal is configured for determining the location related information further based on at least one of:
    a location of the user terminal using a global satellite network module of the user terminal;
    a location of a reference terminal;
    decoding of a reference terminal ID of a reference terminal served by the satellite with a signal received by the user terminal; and
    determining a location or identifier of a reference terminal and determining a distance between the user terminal and the reference terminal.

12. The user terminal of claim 11, wherein the user terminal is configured for determining the location related information based on the location of the user terminal and to derive at least one of a location ID associated with the location and an area-ID indicating a subsection of a total area covered by the satellite.

13. A wireless communication network comprising:
    a satellite;
    a precoding unit of claim 1; and
    at least one user terminal configured to communicate with a satellite based on a channel state information, wherein the user terminal is configured for transmitting, to a precoding unit precoding the communication from the satellite to the terminal, a location related information instead of a channel state information.

14. A method for operating a precoding unit configured to precode a communication between a satellite and at least one terminal based on a channel state of a channel between the satellite and the at least one terminal, wherein the method comprises:
receiving a location related information indicating a location of the at least one terminal;
determining a predicted channel state information related to the channel state between the at least one terminal and a satellite using the location related information; and
precoding the communication between the satellite and the at least one terminal according to the predicted channel state information, the method performing at least one of:
accessing a memory having stored thereon different predetermined channel state values associated with different locations, and deriving the predicted channel state information using at least one predetermined channel state value;
interpolating or extrapolating the predicted channel state information using the location related information and a combination of at least a first predetermined channel state value and a second predetermined channel state value;
iteratively determining the predicted channel state information including determining a predicted channel state information of a second iteration based on a predicted channel state information of a previous first determination of the predicted channel state information and/or based on a location related information used for the previous first determination of the predicted channel state information; and
verifying the predicted channel state information using the predicted channel state information of the previous first determination of the predicted channel state information and/or using the location related information used for the previous first determination of the predicted channel state information.

15. A method for operating a user terminal configured to communicate with a satellite based on a channel state information, the method comprising:
transmitting, to a precoding unit configured for precoding a communication between the satellite and the terminal, a location related information instead of a channel state information;
determining the location related information based on decoding of a terminal ID of the terminal served by the satellite, the terminal ID being a reference terminal ID or a user terminal ID; and
receiving signals transmitted to one or more terminals, to decode the received signals, to determine a signal-to-interference-plus-noise-ratio for each of the signals, to determine the terminal ID being addressed with a signal comprising a highest signal-to-interference-plus-noise-ratio, and to use the terminal ID at least as a part of the location related information.

16. A non-transitory digital storage medium having a computer program stored thereon to perform a method for operating a precoding unit configured to precode a communication between a satellite and at least one terminal based on a channel state of a channel between the satellite and the at least one terminal, wherein the method comprises:
receiving a location related information indicating a location of the at least one terminal;
determining a predicted channel state information related to the channel state between the at least one terminal and a satellite using the location related information; and
precoding the communication between the satellite and the at least one terminal according to the predicted channel state information, the method performing at least one of:
accessing a memory having stored thereon different predetermined channel state values associated with different locations, and deriving the predicted channel state information using at least one predetermined channel state value;
interpolating or extrapolating the predicted channel state information using the location related information and a combination of at least a first predetermined channel state value and a second predetermined channel state value;
iteratively determining the predicted channel state information including determining the predicted channel state information of a second iteration based on a predicted channel state information of a previous first determination of the predicted channel state information and/or based on a location related information used for the previous first determination of the predicted channel state information; and
verifying the predicted channel state information using the predicted channel state information of the previous first determination of the predicted channel state information and/or using the location related information used for the first determination of the predicted channel state information,
when said computer program is run by a computer.

17. A non-transitory digital storage medium having a computer program stored thereon to perform a method for operating a user terminal configured to communicate with a satellite based on a channel state information, the method comprising:
transmitting, to a precoding unit configured for precoding a communication between the satellite and the terminal, a location related information instead of a channel state information;
determining the location related information based on decoding of a terminal ID of the terminal served by the satellite, the terminal ID being a reference terminal ID or a user terminal ID; and
receiving signals transmitted to one or more terminals, to decode the received signals, to determine a signal-to-interference-plus-noise-ratio for each of the signals, to determine the terminal ID being addressed with a signal comprising a highest signal-to-interference-plus-noise-ratio, and to use the terminal ID at least as a part of the location related information,
when said computer program is run by a computer.

* * * * *